United States Patent
Baek et al.

(10) Patent No.: US 7,292,403 B2
(45) Date of Patent: Nov. 6, 2007

(54) LOW FREQUENCY DISTURBANCE COMPENSATION CONTROL DEVICE AND DISK DRIVE USING THE SAME

(75) Inventors: Sang-eun Baek, Incheon-si (KR); Sang-min Suh, Seoul (KR); Jun-seok Shim, Seongnam-si (KR); Chang-ik Kang, Jeju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 137 days.

(21) Appl. No.: 11/328,114

(22) Filed: Jan. 10, 2006

(65) Prior Publication Data

US 2006/0176605 A1    Aug. 10, 2006

(30) Foreign Application Priority Data

Feb. 4, 2005    (KR) .................. 10-2005-0010614

(51) Int. Cl.
*G11B 5/596* (2006.01)
(52) U.S. Cl. ................. 360/77.02; 360/77.07
(58) Field of Classification Search ............ None
See application file for complete search history.

(56) References Cited

U.S. PATENT DOCUMENTS

| | | | |
|---|---|---|---|
| 6,411,461 B1 * | 6/2002 | Szita ................ 360/77.07 |
| 7,038,877 B2 * | 5/2006 | Kohso et al. ............ 360/78.05 |
| 2003/0058558 A1 * | 3/2003 | Ottesen et al. ............ 360/31 |
| 2007/0064334 A1 * | 3/2007 | Jia et al. .................. 360/77.02 |

FOREIGN PATENT DOCUMENTS

| KR | 1999-024805 A | 4/1999 |
|---|---|---|
| KR | 10-2004-0052273 A | 6/2004 |

* cited by examiner

*Primary Examiner*—Andrew L. Sniezek
(74) *Attorney, Agent, or Firm*—Sughrue Mion Pllc.

(57) ABSTRACT

A servo control device for a disk drive capable of effectively compensating for a low frequency disturbance incoming to the disk drive is provided. The servo control device includes: a state variable estimator calculating a position estimation error based on a control input for controlling motion of a head and a position error signal by using a predetermined state equation; an estimation filter calculating a disturbance estimation value from the position estimation error by using a mathematical relation between a disturbance and the position estimation error; and a subtractor subtracting the disturbance estimation value from the control input.

11 Claims, 13 Drawing Sheets

LOW FREQUENCY DISTURBANCE COMPENSATION CONTROL DEVICE AND DISK DRIVE USING THE SAME

CROSS-REFERENCE TO RELATED PATENT APPLICATION

This application claims priority from Korean Patent Application No. 10-2005-0010614, filed on Feb. 4, 2005, in the Korean Intellectual Property Office, the disclosure of which is incorporated herein in its entirety by reference.

BACKGROUND OF THE INVENTION

1. Field of the Invention

Methods and apparatuses consistent with the present invention relate to a servo control for a disk drive, and more particularly, to a servo control for effective compensation of low frequency disturbance incoming to a disk drive.

2. Description of Related Art

In general, a disk drive is a data storage apparatus that reads or writes data from or to a disk by using a magnetic head. Because a disk drive tends to have a high capacity, a high density, and a compact size, a bit per inch (BPI) in a rotational direction and a track per inch (TPI) in a radial direction of the disk drive become large. As a result, there is a demand for a highly accurate mechanism in the disk drive.

An aspect of track following control of the disk drive is to locate a head at the center of a target track. Track following control error may occur due to various types of disturbance. In particular, a portable drive, such as a micro drive, is vulnerable to low frequency vibration and impact.

Referring to FIG. 1, a conventional servo control system for a disk drive includes a repetitive run-out (RRO) compensator 110, a state estimator 120, state feedback controllers 130A and 130B, summing units 140A and 140B, and a voice coil motor (VCM) driver/actuator 150.

Generally, a circuit block including the RRO compensator 110, the state estimator 120, the state feedback controllers 130A and 130B, and the summing units 140A and 140B are collectively referred to as a track following control circuit 1000. In the present invention, the track following control circuit 1000 is represented by a transfer function −C(z).

The summing units 160A and 160B are equivalent to disturbance d and disk run-out, respectively, occurring in a head disk assembly of the disk drive.

The state estimator 120 has a function of estimating values of position, speed, and bias from a position error signal (PES) and a control input. The RRO compensator 110 has a function of compensating for RRO disturbance, $X_{RUNOUT}$, due to a disk eccentricity. The state feedback controllers 130A and 130B calculate a control input signal by combining the estimated values of position, speed, and bias and apply a control input signal to the VCM driver/actuator 150. The estimated value of bias is used for an integrator function in the control circuit to compensate for the low frequency disturbance component in the disturbance d incoming to the system. However, if a gain of the integrator is increased to improve low frequency disturbance compensation performance, there is a problem in that stability of the control system is lowered.

SUMMARY OF THE INVENTION

The present invention provides a servo control device for a disk drive capable of accurately estimating and effectively compensating for a low frequency disturbance incoming to the disk drive and a disk drive using the servo control device.

According to an aspect of the present invention, there is provided a low frequency disturbance compensation control device for a disk drive comprising: a state variable estimator calculating a position estimation error based on a control input for controlling motion of a head and a position error signal by using a predetermined state equation; an estimation filter calculating a disturbance estimation value from the position estimation error by using a mathematical relation between a disturbance and the position estimation error; and a subtractor subtracting the disturbance estimation value from the control input.

According to another aspect of the present invention, there is provided a disk drive comprising: a track following control circuit estimating state information values of motion of a head including a position, a speed and a bias of the head from a position error signal and generating a track following control input based on the estimated state information values by using a predetermined state feedback control process; a disturbance observer calculating a position estimation error from the track following control input and the position error signal and generating a disturbance estimation value from the position estimation error by using a transfer function designed by using a mathematical relation between a disturbance and the position estimation error; a subtractor subtracting the disturbance estimation value from the track following control input; a voice coil motor driver/actuator moving the head on a track by generating a driving current corresponding to an output of the subtractor and generating a position error signal according to the movement of the head.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

A disk drive includes a head disk assembly (HDA) constructed with mechanical parts and an electronic circuit unit.

Figure 2:
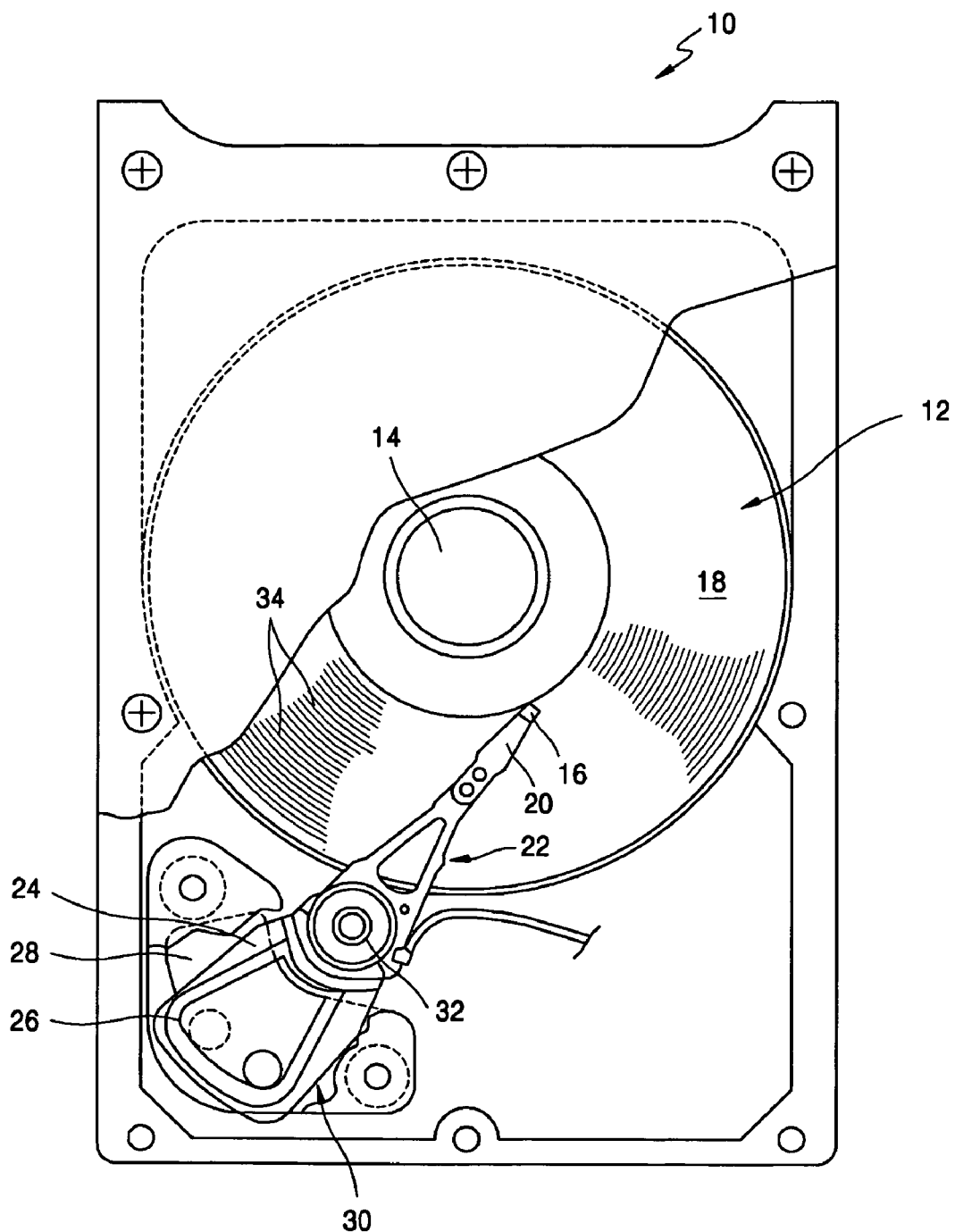
FIG. 2 is a top view showing a head disk assembly of a disk drive to which an exemplary embodiment of the present invention is applied.

FIG. 2 is a plan view showing the HDA 10 of a disk drive to which the present invention is applied. The HDA 10 includes at least one magnetic disk 12 rotated by a spindle motor 14. In addition, the HDA 10 includes transducers (not shown) disposed adjacent to disk surfaces.

Each of the transducers reads/writes information from/on the disks 12 by sensing magnetic fields of the disks 12 and magnetizing the disks 12. Typically, the transducer is associated with each of the disk surfaces. Although a single transducer is described, it should be understood that the transducer may comprise a read transducer for sensing the magnetic fields of the disks 12 and a write transducer for magnetizing the disks 12. The read transducer is made of a magneto-resistive (MR) material.

The transducer may be integrated to a head 16. The head 16 typically forms an air gap between the transducer and the disk surfaces. The head 16 is incorporated into a head stack assembly (HSA) 22. The HSA is attached to an actuator arm 24 having a voice coil 26. The voice coil 26 is disposed adjacent to a magnetic assembly 28 to define a voice coil motor (VCM) 30. When current is applied to the voice coil 26, the VCM 30 generates a torque for rotating the actuator arm 24 about a bearing assembly 32. Rotation of the actuator arm 24 moves the transducer across the disk surface.

Typically, information is recorded in circular tracks 34 on a disk 12. Each of the tracks 34 comprises a plurality of sectors. Each of the sectors comprises data fields and identification fields. The identification fields include a gray code used to identify a sector and a track (cylinder). The transducer moves across the disk surface in order to read or write information recorded in other tracks 34.

Figure 3:
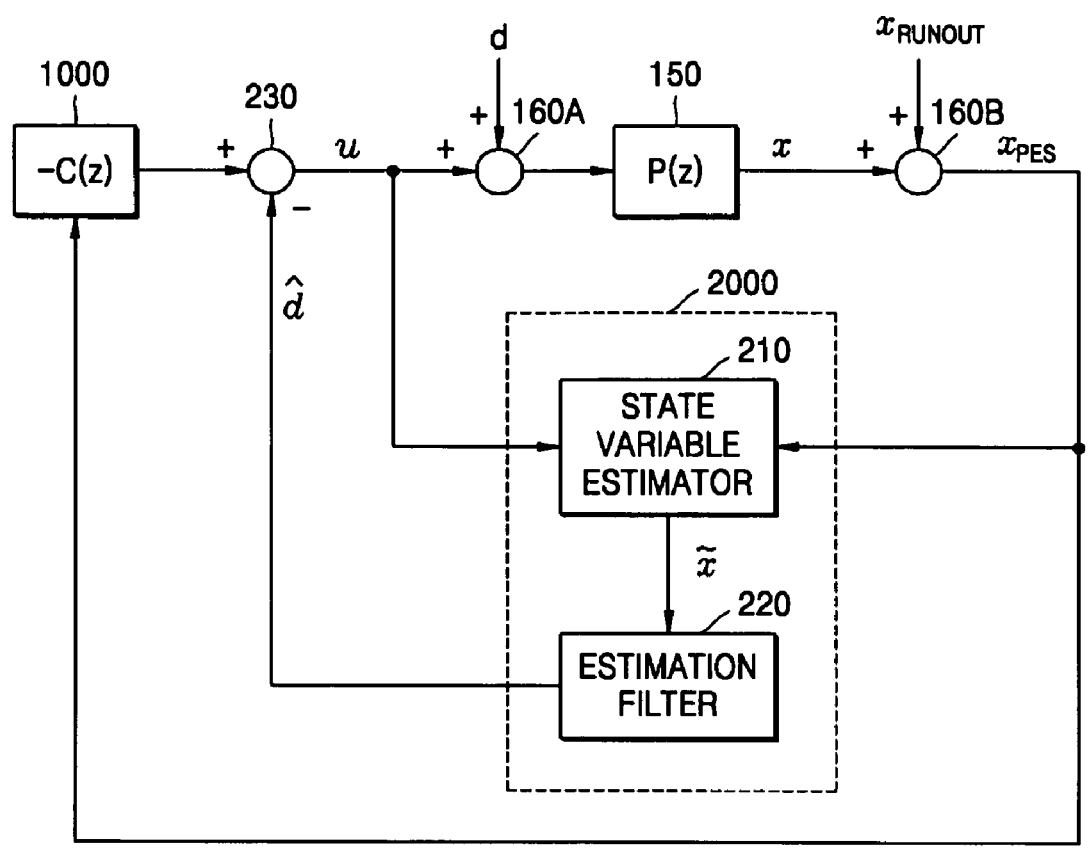
FIG. 3 is a view showing a construction of a servo control system for a disk drive including a low frequency disturbance compensation control device according to an exemplary embodiment of the present invention.

FIG. 3 shows an embodiment of a servo control system for a disk drive to which a low frequency disturbance compensation control device of the present invention is applied. The servo control system includes a track following control circuit 1000, a VCM driver/actuator 150, a state variable estimator 210, an estimation filter 220, and a subtractor 230.

A circuit block including the state variable estimator 210 and the estimation filter 220 is collectively referred to as a disturbance observer 2000.

Summing units 160A and 160B are equivalent to disturbance d and disk run-out occurring in the HDA of the disk drive.

Figure 1:
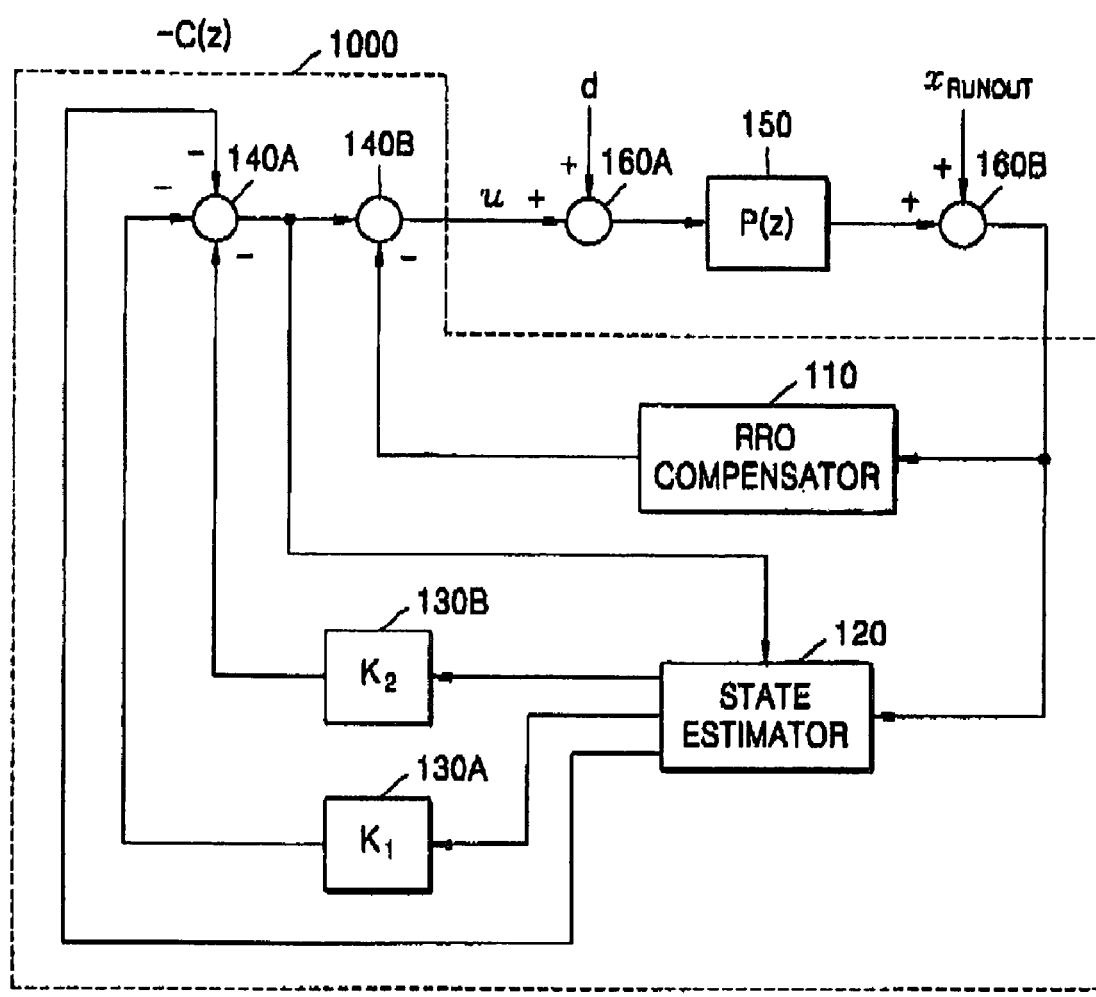
FIG. 1 is a view showing a construction of a conventional servo control system for a disk drive.

The track following control circuit 1000 shown in FIG. 3 has the same construction as that of the conventional track following control circuit 1000 shown in FIG. 1. In an exemplary embodiment of the present invention, the disturbance observer 2000 and the subtractor 230 are added to the conventional servo control system.

The state variable estimator 210 estimates position and speed based on a control input signal u and position error signal $x_{PES}$ and generates a position estimation error $\tilde{x}=x-\bar{x}$. The state variable estimator 210 is represented by Equations 1a and 1b.

$$\bar{x}(k+1)=A_P\hat{x}(k)+B_Pu(k)$$

$$\hat{x}(k)=\bar{x}_n(k)+L(x(k)-C_P\bar{x}(k)) \qquad \text{Equation 1a and 1b}$$

Throughout the specification, in the equations above and in the equations that follow, variables are defined as follows. "$A_P$, $B_P$, $C_P$, K, and I" are arbitrary constants. Variable "k" is an input variable for the discrete time domain function. Variable "z" is an input variable of a function that is converted by z-transformation. Variable "a" is a cutoff frequency. Variable "u(k)" is an impulse function of the discrete time domain. Variable "L" is the gain of the state variable estimator. Variable "βus" is an unstable zero point, while variable "βs" is a stable zero point. And, "$\bar{x}_n$" is a disturbance value that is estimated by the estimation filter.

The estimation filter 220 estimates a disturbance value based on the position estimation error and compensates for the disturbance.

A vibration disturbance incoming to the disk drive is added as a disturbance value to the position estimation error. By applying the position estimation error to a well-designed estimation filter 220, the disturbance value can be estimated.

In order to design a high-performance disturbance observer 2000, it is possible to derive a mathematical relation between the disturbance and the position estimation error and design an appropriate estimation filter 220. An exemplary estimation filter $H_{EST}(z)$ can be obtained by dividing a low pass filter transfer function $H_{LPF}(z)$ by a minimum phase system transfer function $H_{MIN}(z)$ as shown in Equation 2.

$$H_{EST}(z) = \frac{H_{LPF}(z)}{H_{MIN}(z)} \quad \text{[Equation 2]}$$

Now, the derivation of the mathematical relation between the disturbance and the position estimation error and the design of the estimation filter 220 will be described in detail.

By combining Equations 1a and 1b, representing the state variable estimator 210, Equation 3 is obtained.

$$\bar{x}(k+1) = (A_P - A_P L C_P)\bar{x}(k) + A_P L x_{PES}(k) + B_P u(k) \quad \text{[Equation 3]}$$

Figure 4:
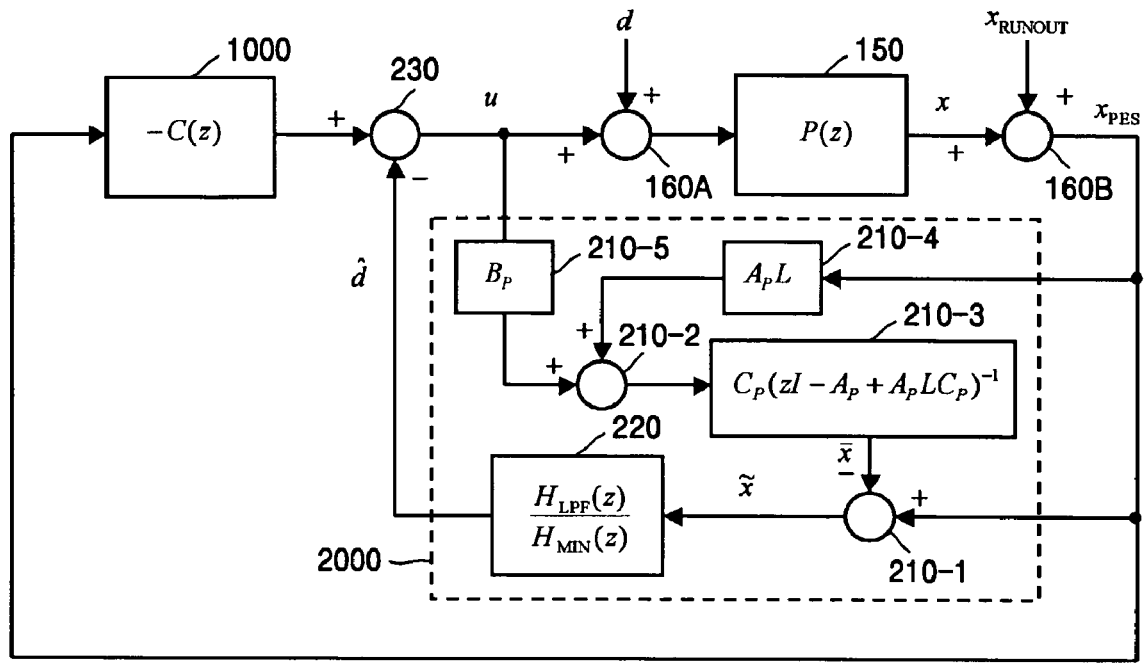
FIG. 4 is an equivalent circuit diagram transformed from the circuit diagram of FIG. 3.

By using Equation 3, the circuit diagram of FIG. 3 can be transformed into an equivalent circuit diagram of FIG. 4. By using a matrix calculation method and a linear system theory, Equation 4 can be obtained.

$$(zI - A_P + A_P L C_P)^{-1} \begin{array}{c} 1 - C_P \\ \\ A_P L \end{array} = \frac{\det(zI - A_P + A_P L C_P) - C_P \text{Adj}(zI - A_P + A_P L C_P) A_P L}{\det(zI - A_P + A_P L C_P)}$$

$$= \frac{\det(zI - A_P)}{\det(zI - A_P + A_P L C_P)} \quad \text{[Equation 4]}$$

Figure 5:
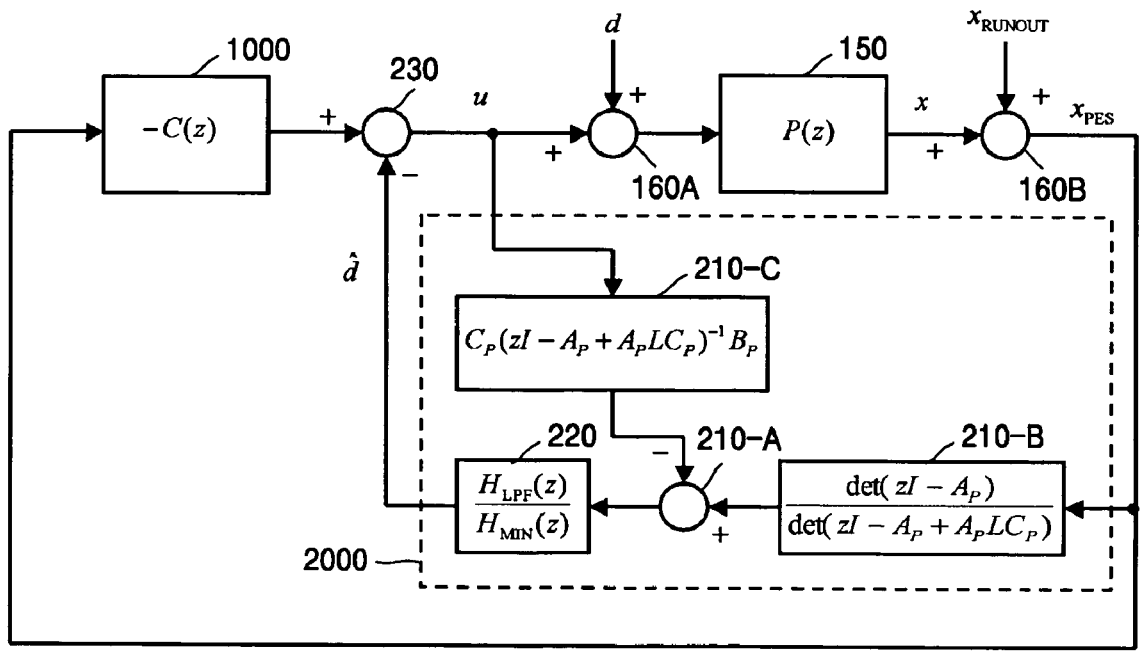
FIG. 5 is an equivalent circuit diagram transformed from the circuit diagram of FIG. 4.

By using Equation 4, the circuit diagram of FIG. 4 can be transformed into an equivalent circuit diagram of FIG. 5. The estimation error due to a disturbance can be estimated by the circuit diagram of FIG. 5. The estimation is represented by Equation 5.

$$\tilde{x}(z) = \frac{\det(zI - A_P)}{\det(zI - A_P + A_P L C_P)}$$
$$P(z)(d(z) + u(z)) - C_P(zI - A_P + A_P L C_P)^{-1} B_P u(z)$$
$$= \frac{\det(zI - A_P)}{\det(zI - A_P + A_P L C_P)} \frac{C_P \text{Adj}(zI - A_P) B_P}{\det(zI - A_P)}$$
$$(d(z) + u(z)) - C_P(zI - A_P + A_P L C_P)^{-1} B_P u(z)$$
$$= C_P(zI - A_P + A_P L C_P)^{-1} B_P(d(z) + u(z)) - C_P(zI - A_P + A_P L C_P)^{-1} B_P u(z)$$
$$= C_P(zI - A_P + A_P L C_P)^{-1} B_P d(z) \quad \text{[Equation 5]}$$

The estimation filter 220 according to the present invention is selected by using Equation 6.

$$H_{EST}(z) = H_{INV}(z) = \frac{1}{C_P(zI - A_P + A_P L C_P)^{-1} B_P} \quad \text{[Equation 6]}$$

By selecting the estimation filter 220 represented by Equation 6, it is possible to obtain an accurate disturbance value represented by Equation 7.

$$\hat{d}(z) = H_{INV}(z)\tilde{x}(z) = d(z) \quad \text{[Equation 7]}$$

Here, since $H_{INV}(z)$ represents a non-causal system, it is impossible to implement the transfer function $H_{INV}(z)$. Therefore, a low pass filter represented by Equation 8 is added.

$$H_{LPF}(z) = \frac{1-a}{z-a} \quad \text{[Equation 8]}$$

Equation 9 represents the estimation filter 220 designed by adding the lower pass filter represented by Equation 8.

$$H_{EST}(z) = H_{LPF}(z) H_{INV}(z) \quad \text{[Equation 9]}$$
$$= \left(\frac{1-a}{z-a}\right) \frac{1}{C_P \left(\frac{zI - A_P +}{A_P L C_P}\right)^{-1} B_P}$$

The disturbance estimation value is obtained by applying an accrual disturbance to the low pass filter. The obtained disturbance estimation value is represented by Equation 10.

$$\hat{d}(z) = H_{LPF}(z) H_{INV}(z) \tilde{x}(z) = H_{LPF}(z) d(z) \quad \text{[Equation 10]}$$

In general, a VCM driving system P(z) constructed with the VCM driver/actuator 150 has a control delay time, so that the system may be a non-minimum phase system $C_P(zI - A_P + A_P L C_P)^{-1} B_P$ having unstable zero points. In addition, zero points of $C_P(zI - A_P + A_P L C_P)^{-1} B_P$ are identical to those of P(z), there is a problem in that the aforementioned non-causal system $H_{INV}(z)$ becomes unstable.

In order to solve the problem, the non-minimum phase system $C_P(zI - A_P + A_P L C_P)^{-1} B_P$ is designed as a product of the minimum phase system transfer function $H_{MIN}(z)$ and the all pass filter transfer function $H_{AP}(z)$.

$$C_P(zI - A_P + A_P L C_P)^{-1} B_P = H_{MIN}(z) H_{AP}(z) \quad \text{[Equation 11]}$$

For example, it can be assumed that the non-minimum phase system $C_P(zI - A_P + A_P L C_P)^{-1} B_P$ is represented by Equation 12.

$$C_P(zI - A_P + A_P L C_P)^{-1} B_P = K \frac{(z + \beta_{US})(z + \beta_S)}{\det(zI - A_P + A_P L C_P)} \quad \text{[Equation 12]}$$

If βus is an unstable zero point out of the two zero points of Equation 12, the minimum phase system transfer function $H_{MIN}(z)$ and the all pass filter transfer function $H_{AP}(z)$ can be represented by Equation 13.

$$H_{\text{MIN}}(z) = K\beta_{US} \frac{(z+\beta_S)(z+1/\beta_{US})}{\det(zI - A_P + A_P LC_P)} \quad \text{[Equation 13]}$$

$$H_{AP}(z) = \frac{1}{\beta_{US}} \frac{(z+\beta_{US})}{(z+1/\beta_{US})}$$

The estimation filter 220 designed based on Equation 14 is a stable causal system, so that the estimation filter 220 can be practically implemented.

$$H_{EST}(z) = \frac{H_{LPF}(z)}{H_{\text{MIN}}(z)} \quad \text{[Equation 14]}$$

$$= \left(\frac{1-a}{z-a}\right) \frac{\det(zI - A_P + A_P LC_P)}{K\beta_{US}(z+\beta_s)(z+1/\beta_{US})}$$

It can be understood that the disturbance estimation value is obtained by applying the actual disturbance value to the low pass filter and the all pass filter, represented by Equation 15.

$$\hat{d}(z) = \frac{H_{LPF}(z)}{H_{\text{MIN}}(z)} \tilde{x}(z) \quad \text{[Equation 15]}$$

$$= H_{LPF}(z) H_{AP}(z) d(z)$$

A transfer function $H_{OPEN}(z)$ of an open loop of FIG. 4 implemented to test a performance of the system according to an exemplary embodiment of the present invention is represented by Equation 16.

$$H_{OPEN}(z) = \quad \text{[Equation 16]}$$

$$\frac{P(z)C(z) + P(z)\frac{\det(zI - A_P)}{\det(zI - A_P + A_P LC_P)}\frac{H_{LPF}(z)}{H_{\text{MIN}}(z)}}{1 - \frac{H_{LPF}(z)}{H_{\text{MIN}}(z)} C_P(zI - A_P + A_P LC_P)^{-1} B_P} =$$

$$\frac{P(z)C(z) + H_{LPF}(z)H_{AP}(z)}{1 - H_{LPF}(z)H_{AP}(z)}$$

A transfer function between the disturbance and the position error signal $x_{PES}$ is obtained by using Equation 16. The transfer function is represented by Equation 17.

$$\frac{x_{PES}(z)}{d(z)} = \frac{P(z)}{1 + H_{OPEN}(z)} = \frac{(1 - H_{LPF}(z)H_{AP}(z))P(z)}{1 + P(z)C(z)} \quad \text{[Equation 17]}$$

In addition, a transfer function between the disk run-out $x_{runout}$ and the position error signal $x_{PES}$ is represented by Equation 18.

$$\frac{x_{PES}(z)}{x_{RUNOUT}(z)} = \frac{1}{1 + H_{OPEN}(z)} = \frac{1 - H_{LPF}(z)H_{AP}(z)}{1 + P(z)C(z)} \quad \text{[Equation 18]}$$

Now, the performance of the vibration compensation system according to an exemplary embodiment of the present invention will be described with reference to experimental results as follows.

In the experiment, a desk top disk drive is tested. The track density, track width and the disk rotation speed of the tested disk drive are 130,000 TPI, 0.19 μm, and 7200 rpm, respectively. The transfer function of the VCM driving system used for the disk drive is represented by Equation 19.

$$P(z) = \frac{0.013377(z + 5.248)(z + 0.1539)}{z(z-1)^2} \quad \text{[Equation 19]}$$

As shown in Equation 19, since the system has one unstable zero point of −5.248, the system is a non-minimum phase system. The gain of the state variable estimator is set as L=[0.4375, 0.1129, 0]. The transfer function $C_P(zI - A_P + A_P LC_P)^{-1} B_P$ between the disturbance and the position estimation error is represented by Equation 20.

$$C_P(zI - A_P + A_P LC_P)^{-1} B_P = \quad \text{[Equation 20]}$$

$$\frac{0.013377(z + 5.248)(z + 0.1539)}{z(z - 0.75)^2}$$

Therefore, in order to design the estimation filter, the non-minimum phase system and the all pass filter can be selected as represented by Equation 21.

$$H_{\text{MIN}}(z) = \frac{0.070197(z + 0.1906)(z + 0.1539)}{z(z - 0.75)^2} \quad \text{[Equation 21]}$$

$$H_{AP}(z) = \frac{0.19056(z + 5.248)}{(z + 0.1906)}$$

As an example, when α=0.9, the low pass filter is represented by Equation 22.

$$H_{LPF}(z) = \frac{1-a}{z-a} = \frac{0.1}{z - 0.9} \quad \text{[Equation 22]}$$

As a result, the estimation filter is designed as represented by Equation 23.

$$H_{EST}(z) = \frac{H_{LPF}(z)}{H_{\text{MIN}}(z)} = \frac{1.4246 z(z - 0.75)^2}{(z - 0.9)(z + 0.1906)(z + 0.1539)} \quad \text{[Equation 23]}$$

Figure 6:
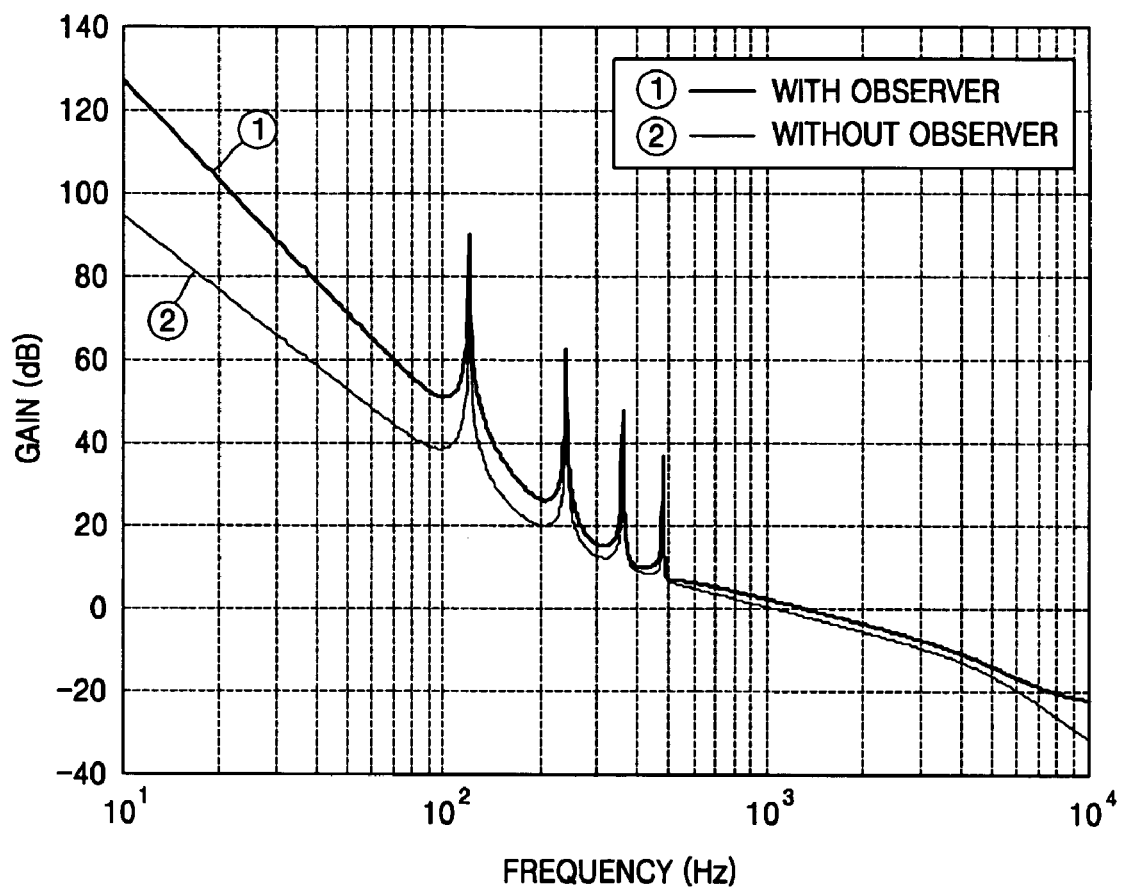
FIG. 6 is a view showing a change in an open-loop frequency characteristic of the servo control system according to presence and absence of a disturbance observer.
Figure 7:
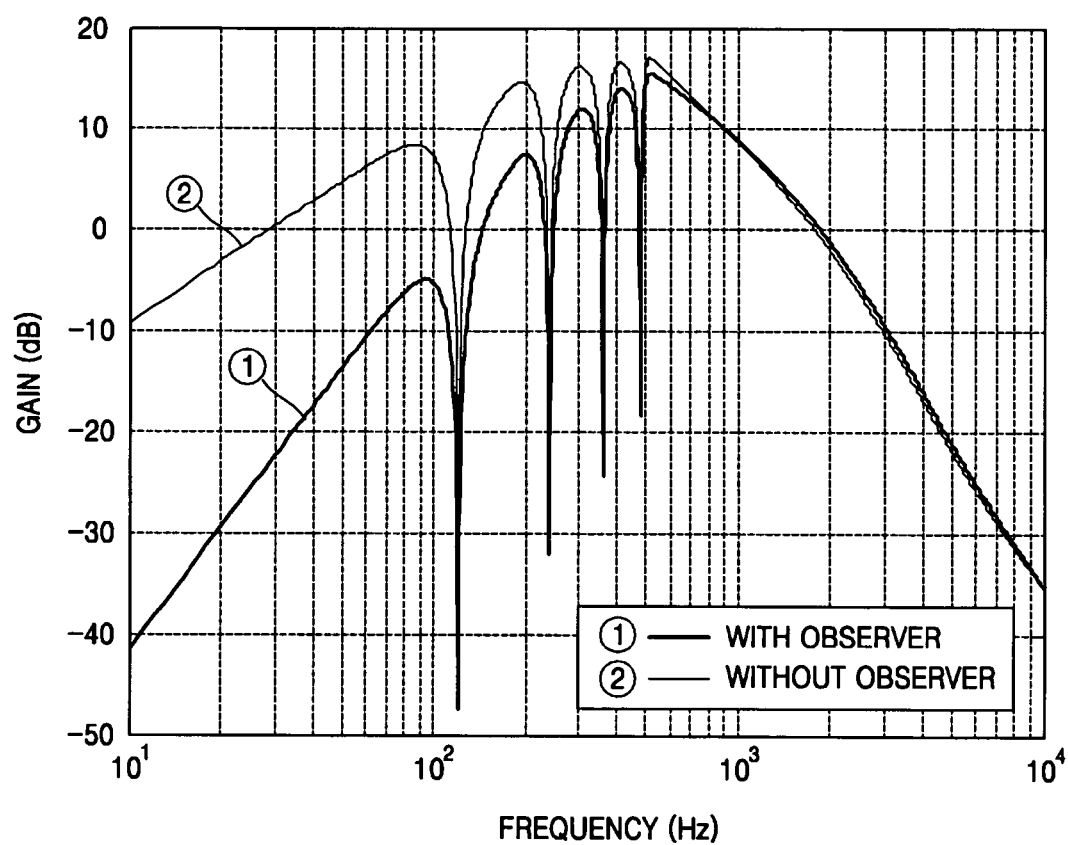
FIG. 7 is a view showing a change in a gain characteristic between a disturbance and a position error signal according to presence and absence of the disturbance observer.
Figure 8:
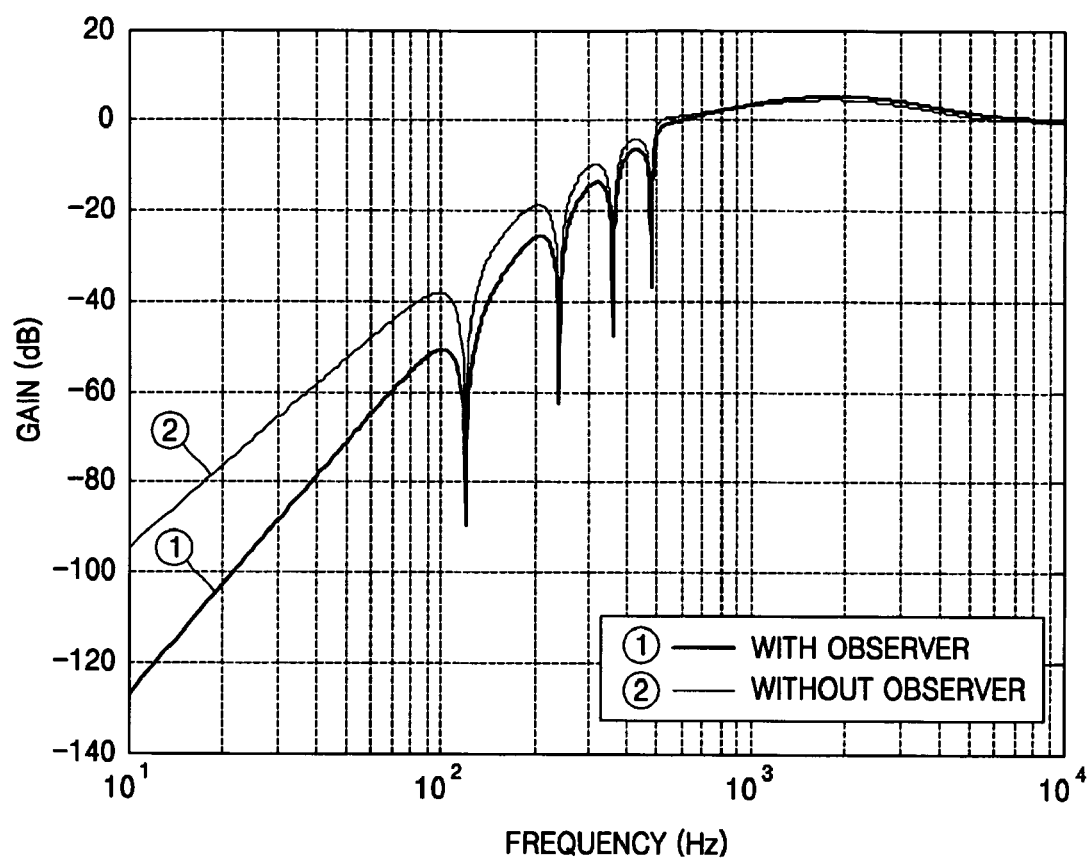
FIG. 8 is a view showing a change in a gain characteristic between a disk run-out and a position error signal according to presence and absence of the disturbance observer.

FIG. 6 shows an open loop frequency characteristic obtained from the transfer function $H_{OPEN}(z)$ represented by Equation 16. FIG. 7 shows a gain characteristic between the disturbance and the position error signal. As shown in FIGS. 6 and 7, it can be understood that influence of disturbance can be greatly reduced by using the disturbance observer, according to an exemplary embodiment of the present invention. For example, the influence of disturbance of 30 dB or more can be reduced at the frequency 10 Hz. FIG. 8 shows a gain characteristic between the disk run-out RUNOUT and the position error signal. As shown in FIG. 8, it can be understood that the influence of disk run-out can be greatly reduced by using the disturbance observer.

Figure 9A:
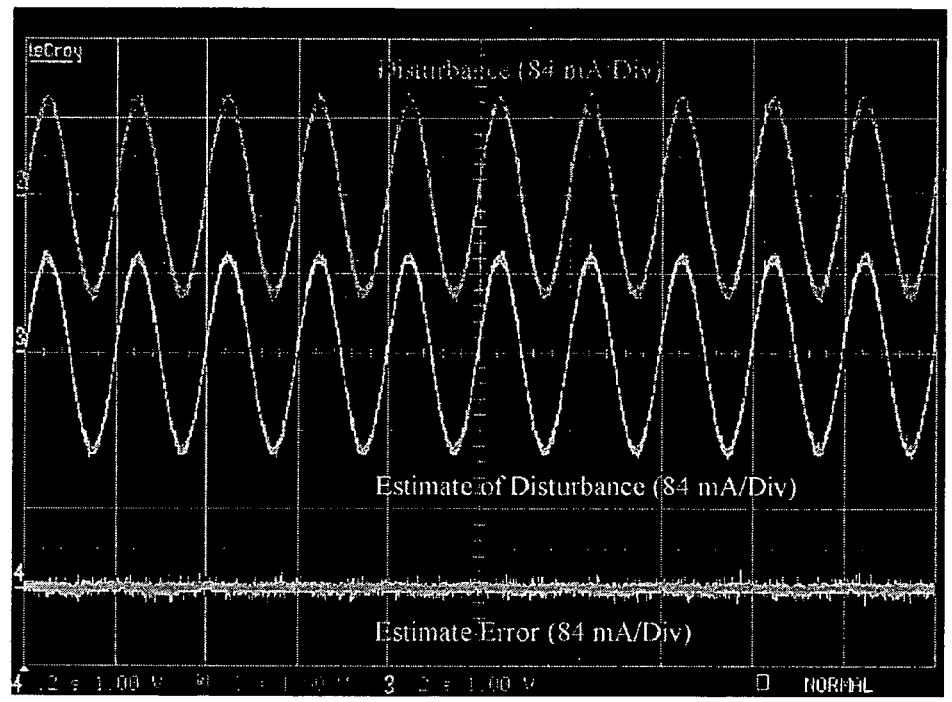
FIG. 9A is a view showing a disturbance estimation performance of a servo control system using a low frequency disturbance compensation control device according to an exemplary embodiment of the present invention in the case of 5 Hz disturbance incoming.
Figure 9B:
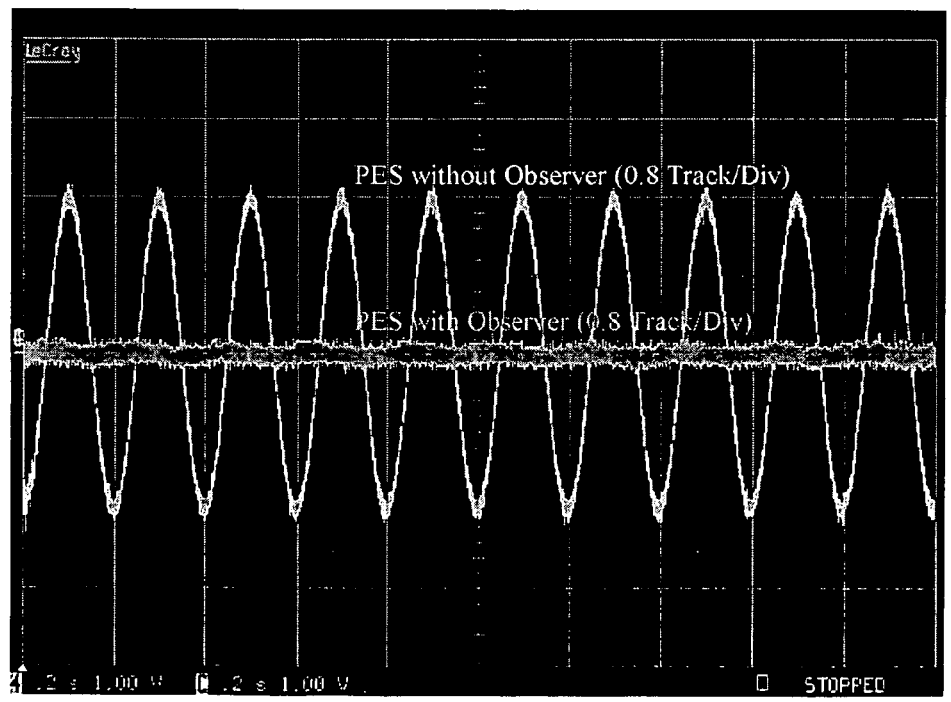
FIG. 9B is a view showing a position error signal of a servo control system using a low frequency disturbance compensation control device according to an exemplary embodiment of the present invention in the case of 5 Hz disturbance incoming.
Figure 10A:
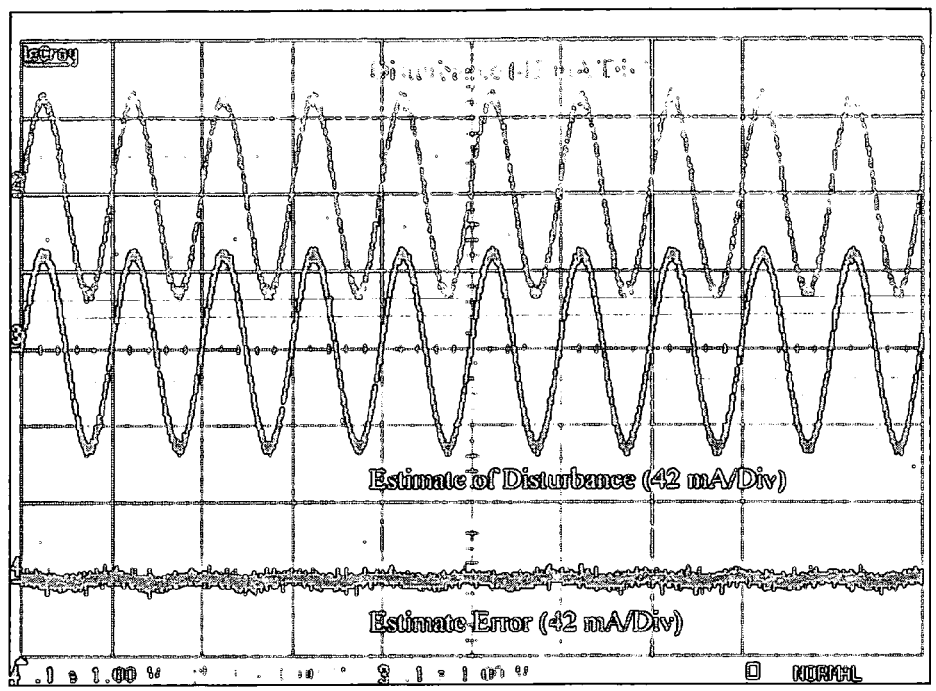
FIG. 10A is a view showing a disturbance estimation performance of a servo control system using a low frequency disturbance compensation control device according to an exemplary embodiment of the present invention in the case of 10 Hz disturbance incoming.
Figure 10B:
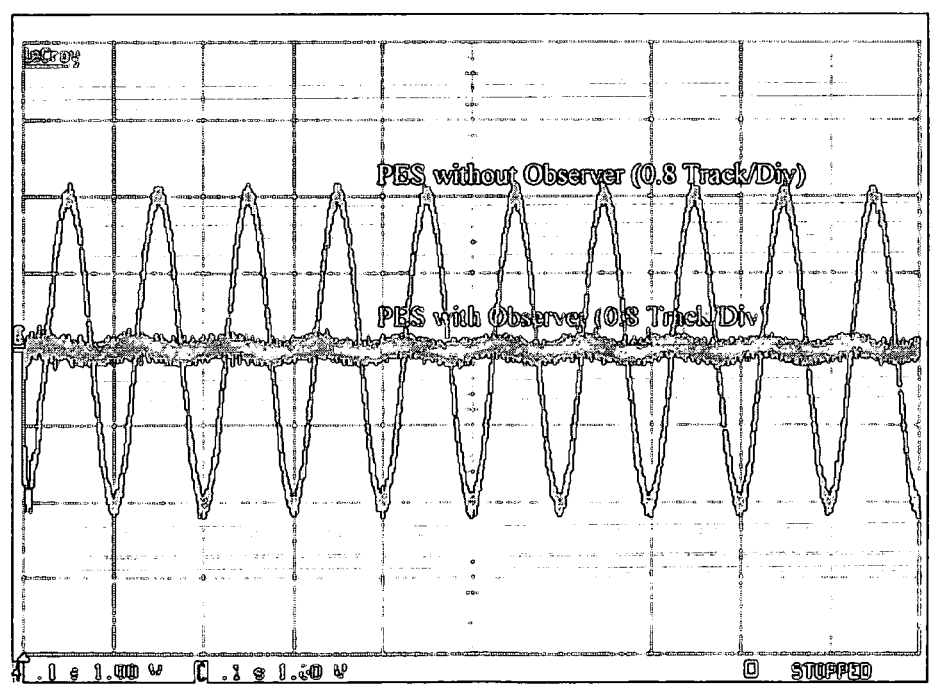
FIG. 10B is a view showing a position error signal of a servo control system using a low frequency disturbance compensation control device according to the present invention in case of 10 Hz disturbance incoming.
Figure 11A:
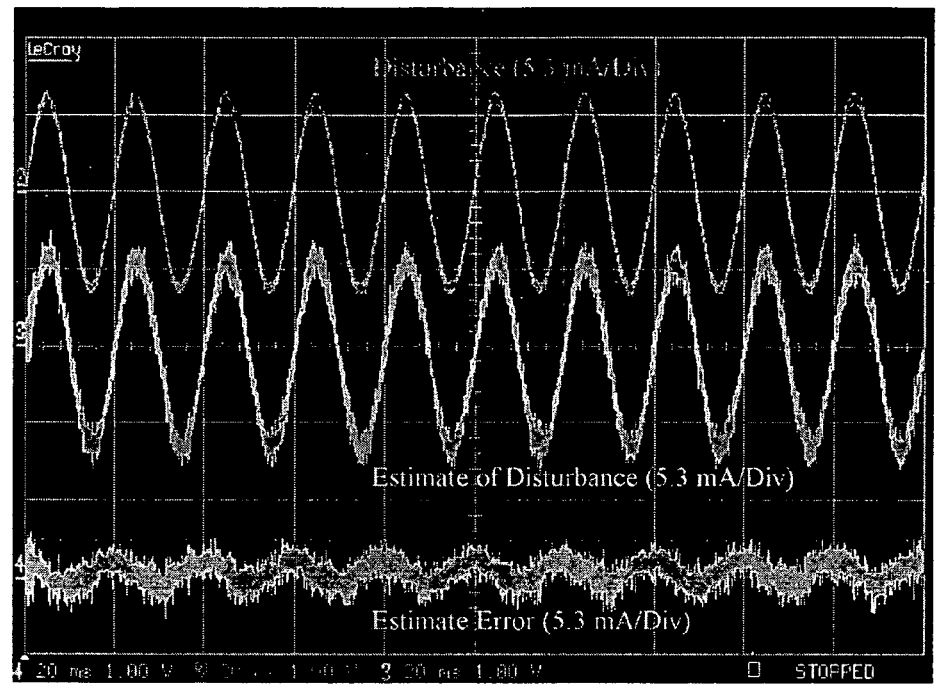
FIG. 11A is a view showing a disturbance estimation performance of a servo control system using a low frequency disturbance compensation control device according to an exemplary embodiment of the present invention in case of 50 Hz disturbance incoming.
Figure 11B:
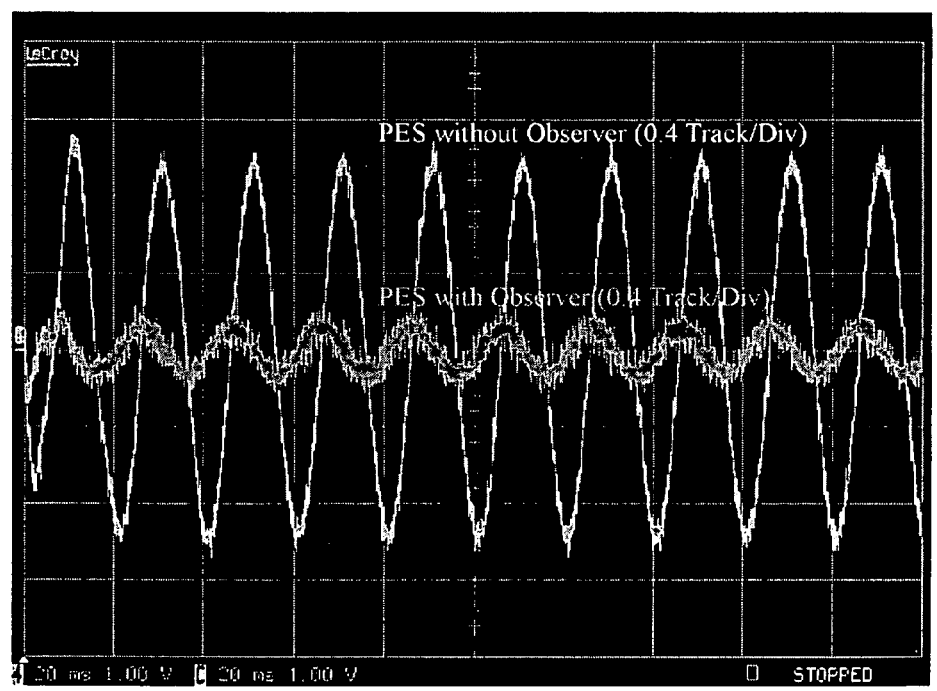
FIG. 11B is a view showing a position error signal of a servo control system using a low frequency disturbance compensation control device according to an exemplary embodiment of the present invention in case of 50 Hz disturbance incoming.
Figure 12A:
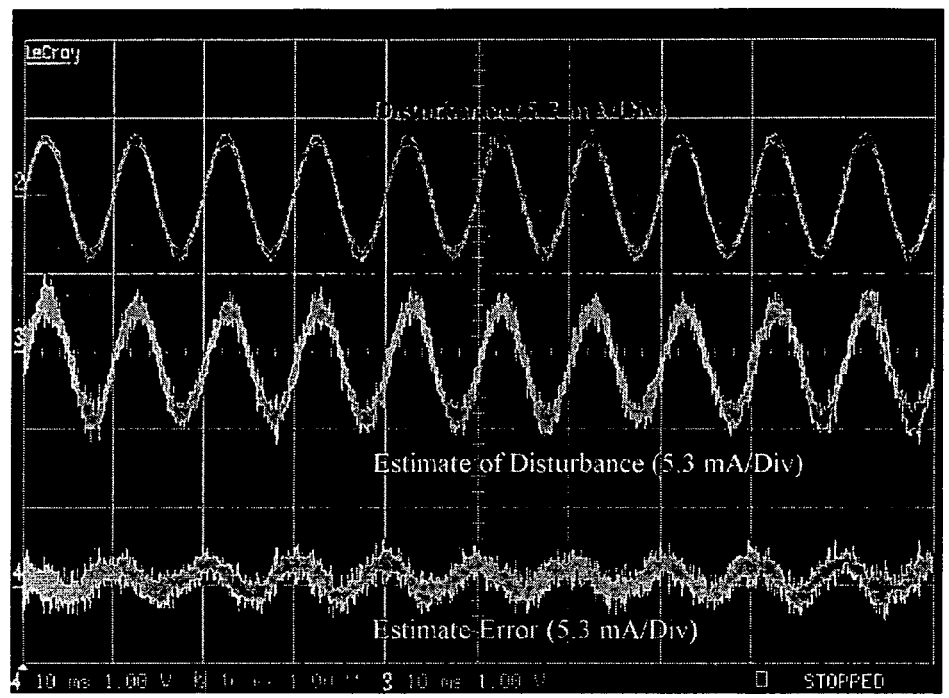
FIG. 12A is a view showing a disturbance estimation performance of a servo control system using a low frequency disturbance compensation control device according to an exemplary embodiment of the present invention in case of 100 Hz disturbance incoming.
Figure 12B:
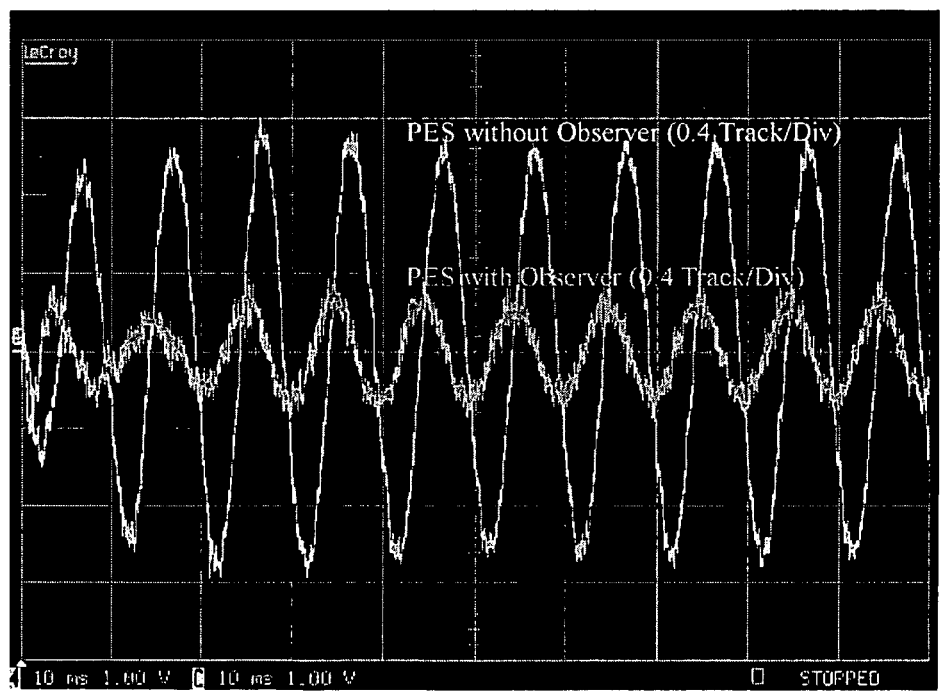
FIG. 12B is a view showing a position error signal of a servo control system using a low frequency disturbance compensation control device according to an exemplary embodiment of the present invention in case of 100 Hz disturbance incoming.
Figure 13A:
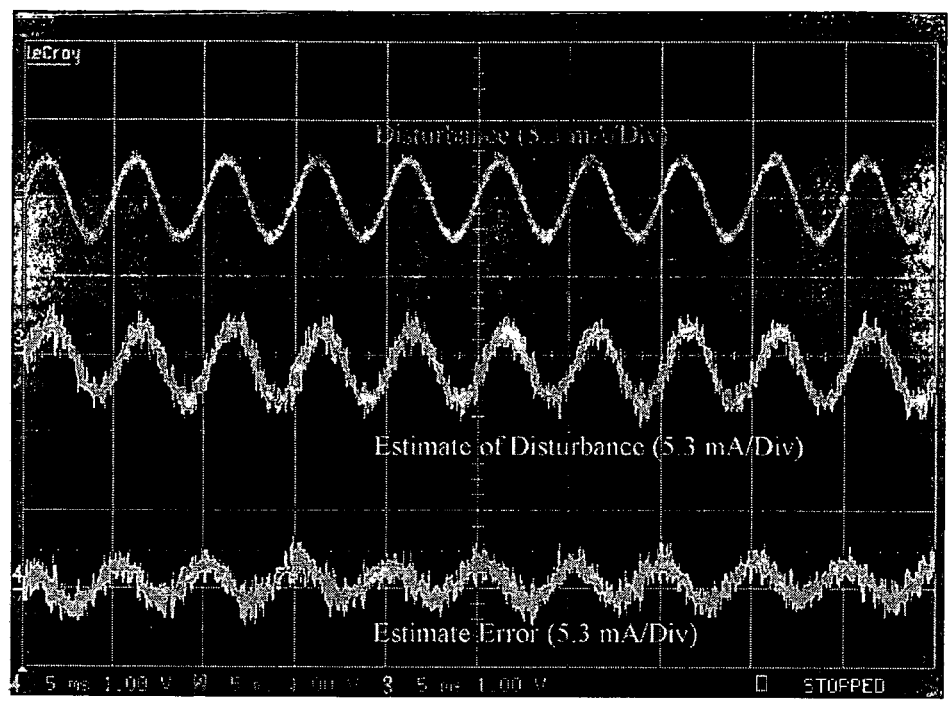
FIG. 13A is a view showing a disturbance estimation performance of a servo control system using a low frequency disturbance compensation control device according to an exemplary embodiment of the present invention in case of 200 Hz disturbance incoming.
Figure 13B:
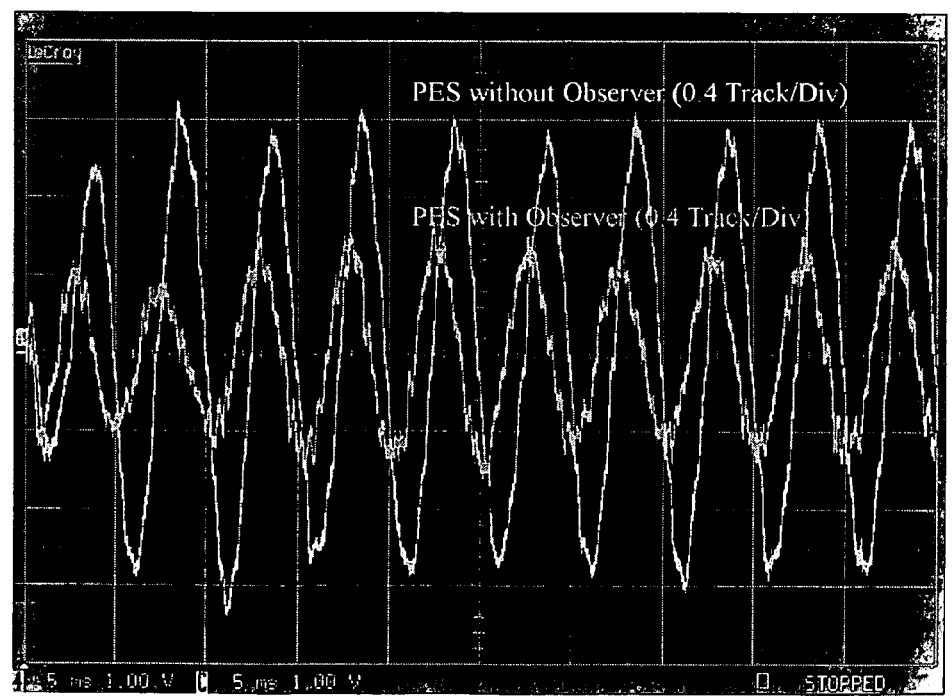
FIG. 13B is a view showing a position error signal of a servo control system using a low frequency disturbance compensation control device according to an exemplary embodiment of the present invention in case of 200 Hz disturbance incoming.
Figure 14A:
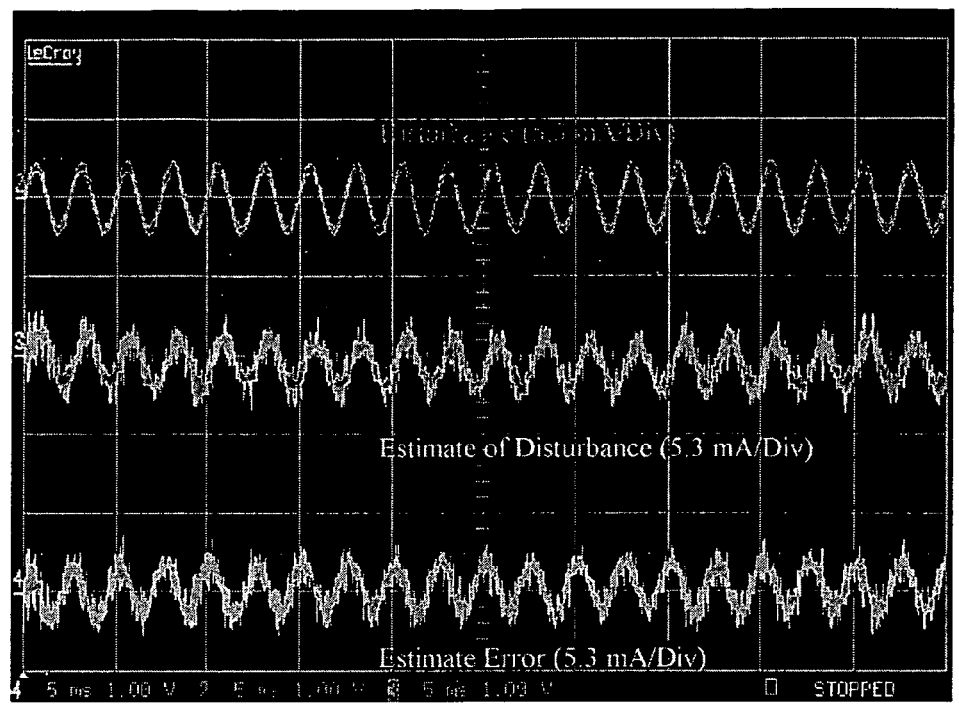
FIG. 14A is a view showing a disturbance estimation performance of a servo control system using a low frequency disturbance compensation control device according to an exemplary embodiment of the present invention in case of 400 Hz disturbance incoming.
Figure 14B:
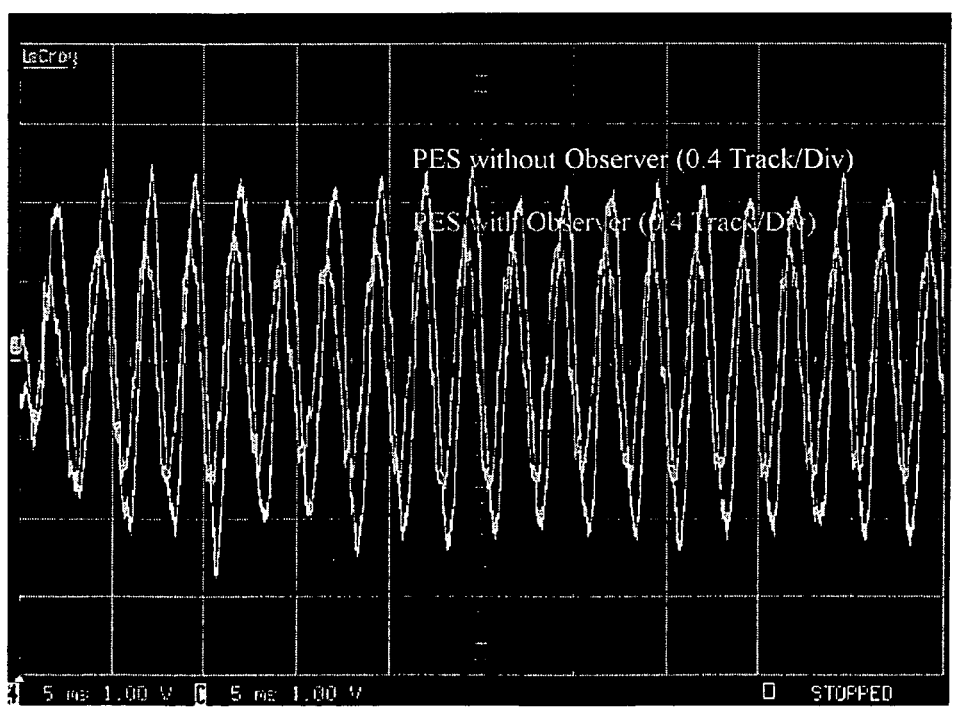
FIG. 14B is a view showing a position error signal of a servo control system using a low frequency disturbance compensation control device according to an exemplary embodiment of the present invention in case of 400 Hz disturbance incoming.

FIGS. 9 to 14 show test results of disturbance estimation performance and position error signal performance in and exemplary case where a sinusoidal vibration disturbance is applied to the system. More specifically, FIGS, 9 to 14 show test results of the performances in cases of the sinusoidal vibration disturbances having frequencies of 5 Hz, 10 Hz, 50 Hz, 100 Hz, 200 Hz, and 400 Hz and amplitudes of 102 mA, 52.5 mA, 6.4 mA, 3.8 mA, 2.6 mA, and 2 mA, respectively. As shown in FIGS. 9 and 10, it can be understood that the disturbance observer according to an exemplary embodiment of the present invention has an almost complete disturbance compensation performance at low frequencies such as 5 and 10 Hz. In addition, as shown in FIGS. 11 to 14, it can be understood that the disturbance observer has a high disturbance compensation performance at low frequencies but a low disturbance compensation performance at high frequencies.

As a result of the test, the disturbance observer according to an exemplary embodiment of the present invention can be effectively used to compensate for disturbance at a frequency of 400 Hz or less.

As described above, according to an exemplary embodiment of the present invention, by using a servo control system capable of accurately estimating disturbance incoming to a disk drive, it is possible to improve track following performance of the disk drive. Furthermore, according to an exemplary embodiment of the invention, it is possible to effectively compensate for low frequency vibration disturbance incoming to a disk drive used for a portable device.

While the present invention has been particularly shown and described with reference to exemplary embodiments thereof, it will be understood by those of ordinary skill in the art that various changes in form and details may be made therein without departing from the spirit and scope of the present invention as defined by the following claims. Therefore, the present invention can be adapted to a variety of disk drives including a hard disk drive.

What is claimed is:

1. A low frequency disturbance compensation control device for a disk drive comprising:
a state variable estimator which calculates a position estimation error based on a control input for controlling motion of a head and a position error signal by using predetermined state equations;
an estimation filter which calculates a disturbance estimation value from the position estimation error by using a mathematical relation between a disturbance and the position estimation error; and
a subtractor which subtracts the disturbance estimation value from the control input.

2. The low frequency disturbance compensation control device according to claim 1, wherein the predetermined state equations include:

$$\bar{x}(k+1)=A_P\hat{x}(k)+B_Pu(k)$$

and $$\hat{x}(k)=\bar{x}_n(k)+L(x(k)-C_P\bar{x}(k)); \text{ and}$$

wherein,
$A_P$, $B_P$, and $C_P$ are constants;
$\bar{x}_n$ is a disturbance value that is estimated by the estimation filter;
u(k) is an impulse function of the discrete time domain;
k is an input variable for the discrete time domain function; and
L is the gain of the state variable estimator.

3. The low frequency disturbance compensation control device according to claim 1, wherein a transfer function $H_{EST}(z)$ of the estimation filter is represented by $$H_{EST}(z) = \frac{H_{LPF}(z)}{H_{MIN}(z)}, \text{ and}$$

wherein $H_{LPF}(Z)$ and $H_{MIN}(z)$ are transfer functions of a low pass filter and a minimum phase system, respectively; and
wherein z is an input variable of a function that is converted by a z-transformation.

4. The low frequency disturbance compensation control device according to claim 1, wherein the estimation filter transfer function $H_{EST}(Z)$ is obtained by representing a non-minimum phase system $C_P(zI-A_P+A_PLC_P)^{-1}B_P$ as a product of the minimum phase system transfer function $H_{MIN}(z)$ and an all pass filter transfer function $H_{AP}(z)$ and dividing a predetermined low pass filter $H_{LPF}(z)$ by the minimum phase system transfer function $H_{MIN}(z)$; and
wherein $A_P$, $B_P$, $C_P$, and I are constants;
z is an input variable of a function that is converted by a z-transformation;
and L is the gain of the state variable estimator.

5. The low frequency disturbance compensation control device according to claim 4, wherein the estimation filter transfer function $H_{EST}(z)$ is set up as $$H_{EST}(z) = \frac{H_{LPF}(z)}{H_{MIN}(z)} = \left(\frac{1-a}{z-a}\right)\frac{\det(zI - A_P + A_PLC_P)}{K\beta_{US}(z+\beta_S)(z+1/\beta_{US})},$$

wherein L is the gain of the state variable estimator;
z is an input variable of a function that is converted by a z-transformation;
$A_P$, $B_P$, $C_P$, K, and I are constants;
α is a cutoff frequency; and
Bus is an unstable zero point.

6. A disk drive comprising:
a track following control circuit which estimates state information values of motion of a head including a position, a speed and a bias of the head from a position error signal and generates a track following control input based on the estimated state information values by using a predetermined state feedback control process;
a disturbance observer which calculates a position estimation error from the track following control input and the position error signal and generates a disturbance estimation value from the position estimation error by using a transfer function designed by using a mathematical relation between a disturbance and the position estimation error;
a subtractor which subtracts the disturbance estimation value from the track following control input;
a voice coil motor driver which moves the head on a track by generating a driving current corresponding to an output of the subtractor and which generates a position error signal according to the movement of the head.

7. The disk drive according to claim 6, wherein the disturbance observer comprises:
a state variable estimator which calculates the position estimation error based on a control input and the position error signal by using predetermined state equations; and
an estimation filter which calculates the disturbance estimation value from the position estimation error by using the mathematical relation between the disturbance and the position estimation error.

8. The disk drive according to claim 7, wherein the predetermined state equations include:

$$\bar{x}(k+1) = A_P \hat{x}(k) + B_P u(k)$$

$$\hat{x}(k) = \bar{x}_n(k) + L(x(k) - C_P \bar{x}(k)), \text{ wherein}$$

k is an input variable for the discrete time domain function;

$A_P$, $B_P$, and $C_P$ are constants;

L is the gain of the state variable estimator;

$\bar{x}_n$ is a disturbance value that is estimated by the estimation filter; and u(k) is an impulse function of the discrete time domain.

9. The disk drive according to claim 7, wherein a transfer function $H_{EST}(z)$ of the estimation filter is represented by $$H_{EST}(z) = \frac{H_{LPF}(z)}{H_{MIN}(z)}, \text{ and}$$

wherein $H_{LPF}(z)$ and $H_{MIN}(z)$ are transfer functions of a low pass filter and a minimum phase system, respectively; and z is an input variable of a function that is converted by z-transformation.

10. The disk drive according to claim 9, wherein the estimation filter transfer function $H_{EST}(z)$ is obtained by representing a non-minimum phase system $C_p(zI - A_P + A_P L C_P)^{-1} B_P$ as a product of the minimum phase system transfer function $H_{MIN}(z)$ and an all pass filter transfer function $H_{AP}(z)$ and dividing a predetermined low pass filter $H_{LPF}(z)$ by the minimum phase system transfer function $H_{MIN}(z)$; and wherein $A_P$, $B_P$, $C_P$ and I are constants; and L is the gain of the state variable estimator.

11. The disk drive according to claim 9, wherein the estimation filter transfer function $H_{EST}(z)$ is set up as $$H_{EST}(z) = \frac{H_{LPF}(z)}{H_{MIN}(z)} = \left(\frac{1-a}{z-a}\right) \frac{\det(zI - A_p + A_p L C_p)}{K \beta_{US}(z + \beta_S)(z + 1/\beta_{US})},$$

wherein $A_P$, $C_P$, I and K are constants;

z is an input variable of a function that is converted by z-transformation

α is a cutoff frequency;

βus is an unstable zero point;

L is the gain of the state variable estimator; and

βs is a stable zero point.

* * * * *